March 23, 1926.
D. B. HANNA
1,577,907
POLE MAKING MACHINE
Filed July 17, 1925   2 Sheets-Sheet 2
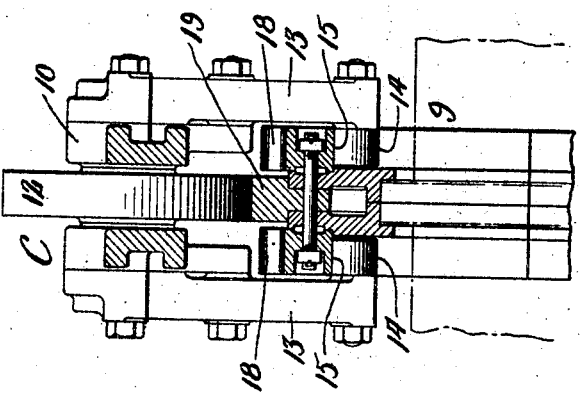
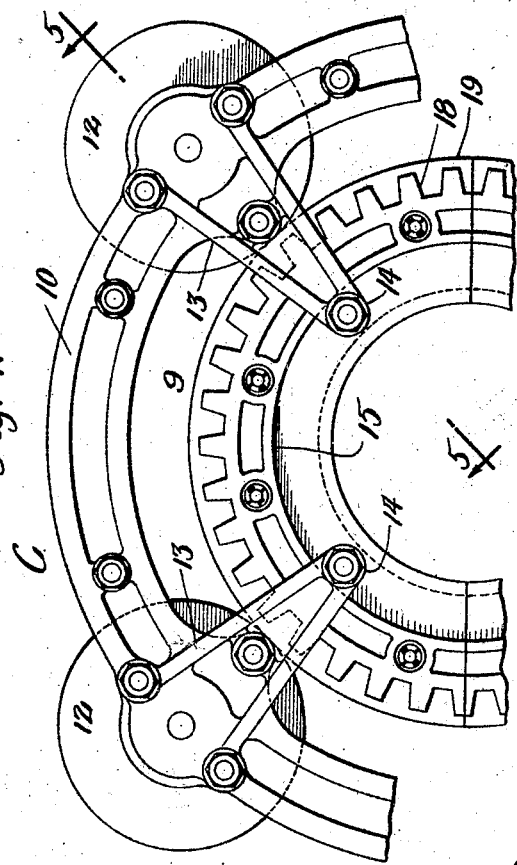
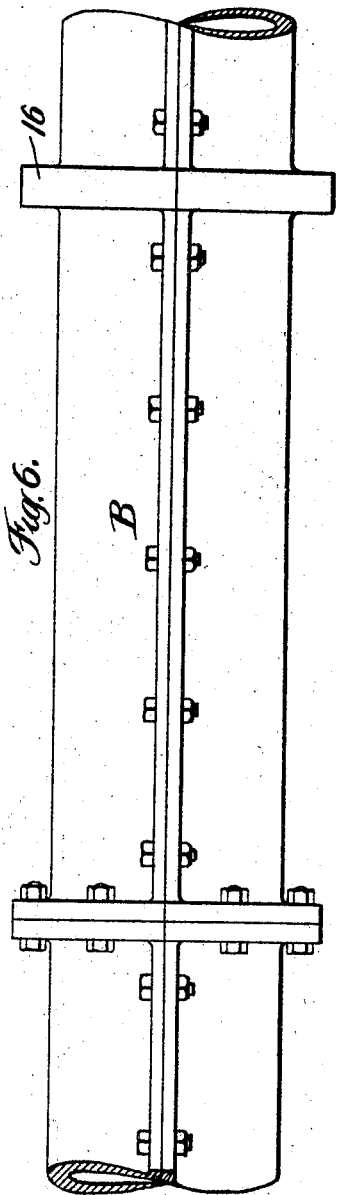
Inventor
David B. Hanna
By his Attorneys
Synnestvedt & Lechner Patented Mar. 23, 1926.

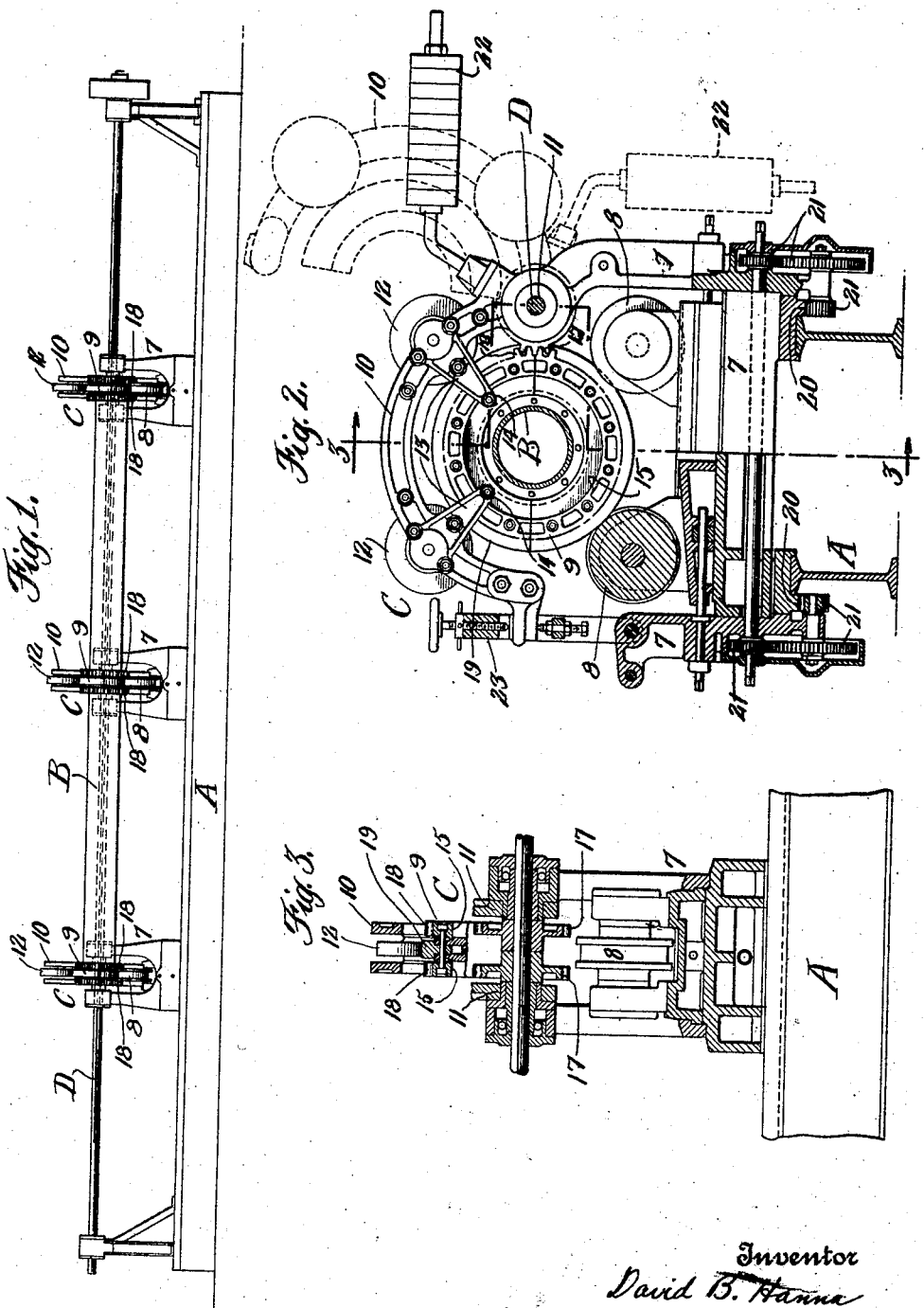

1,577,907

UNITED STATES PATENT OFFICE.

DAVID B. HANNA, OF CHICAGO, ILLINOIS.

POLE-MAKING MACHINE.

Application filed July 17, 1925. Serial No. 44,161.

*To all whom it may concern:*

Be it known that I, DAVID B. HANNA, a citizen of the United States, residing at Chicago, in the county of Cook and State of Illinois, have invented certain new and useful Improvements in Pole-Making Machines, of which the following is a specification.

This invention relates to pole-making machines for making concrete poles and the like, and has for its primary object the provision of simple, durable, and effective supporting and driving means for the mold of such character that the parts thereof may be quickly operatively associated with the mold, thus effecting considerable saving of time and labor in operation of the machine, particularly when changing molds or removing molds.

Another object of my invention resides in the provision of a sectional tire adapted to be quickly connected to the mold and taking the wear incident to operation of the machine.

Still another object of my invention is the provision in a machine of the character described of means whereby it may be easily adjusted to take care of molds of different lengths.

A further object of my invention is the provision of a centrifugal pole machine, the support of which is so constructed that one portion may be moved for exposure or removal of the mold while the remaining portion serves as a cradle for the mold.

Other objects reside in the novel arrangement and construction of parts hereinafter more fully pointed out.

How the foregoing, together with such other objects and advantages as may hereinafter appear, or are incident to my invention, are realized, is illustrated in preferred form in the accompanying drawings, wherein—

Fig. 1 is a diagrammatic longitudinal assembly view of the machine;

Fig. 2. is a partial end view and a partial cross section of the machine;

Fig. 3 is a section taken substantially on the line 3—3 of Fig. 2;

Fig. 4 is a fragmentary end view of a portion of the mold, tire and supporting means;

Fig. 5 is a fragmentary section taken on the line 5—5 of Fig. 4; and

Fig. 6 is a detail view of a portion of the mold showing a modification therein.

Referring now to Fig. 1, it will be seen that the machine comprises in general a base A, a mold B in this instance constructed of a plurality of flanged pipe-like sections bolted or otherwise secured together, a plurality of combined driving, supporting and guiding units C, and a drive shaft D, having suitable bearings, said shaft being drivingly connected with the mold as will hereinafter appear.

Referring now more especially to Figs. 2 to 5 inclusive, the units C are shown constructed as follows: Each unit comprises a lower support 7, carrying in this instance a pair of spaced adjustable flanged supporting rolls 8, for supporting the mold D, thru the medium of the sectional tires 9 to be presently more fully described; and an upper support 10 hinged or pivoted at 11 to the lower support 7, and carrying a pair of spaced guiding rolls 12. The sectional tire 9 is formed of a pair of semi-circular members adapted to be held in tire form around the mold by the support, that is to say, one section of the tire is supported on the rolls 8 and the other section when swung to closed position is so correlated with the first mentioned section to form a ring or tire, the mold, of course, first being inserted therebetween. In this connection, it is to be noted that the upper or hinged support 10 is provided with radial disposed arms 13 carrying rollers 14 adapted to engage the internal peripheral surfaces 15 of the tire, whereby the uppermost section of the tire will carry with said hinged support when it is swung, thus separating the sections to permit the mold to be removed and holding the section of the tire for subsequent cooperative association with the remaining section. The inside diameter or mold engaging surface of the tire sections is of such dimension that the mold will be firmly held by the tire when in closed position, thus in effect, altho not physically, the mold and tires become one element.

In Fig. 5, I have shown the tire in engagement with the abutting flanges of adjacent pipe sections, although it is to be understood that annular flanges, as indicated at 16 in Fig. 6, may be provided at predetermined spaced intervals along the length of the mold for engagement by the tires.

From the foregoing it will be apparent that the mold itself is not subject to any wear from the driving and supporting mechanism and that by virtue of the peculiar construction and the simple methods of associating the tire with the mold, replacement of worn parts may be inexpensively accomplished.

Rotary motion is imparted to the mold B by means of the gears 17 splined to the drive shaft D which is connected in any suitable manner to the source of power, such gears having engagement with the spaced gear portions 18 of the tire.

While I have described each half tire section as being composed of a single member, in actual practice, for convenience in cutting the gear teeth on the tire sections, I form the portions carrying the gear teeth as separate parts as shown in Fig. 5, which are bolted to the tire. I also prefer to make that portion 19 of the tire which runs on the roller separate so that is can be renewed. When this portion of each half section is made separate, as shown in Fig. 5, it may be bolted in place by the same bolts which secure the gear carrying portions in place.

In order that the machine may be accommodated to molds of varying length, I have provided means whereby the units C, which are in effect cradles, may be moved longitudinally of the machine, such means comprising in general longitudinal racks 20 stationary on the base A of the machine and a suitable train of gears 21 carried by the lower support 7 of the units C, upon rotation of which the units are caused to move longitudinally of the machine. The gears 17 are moved with the unit C.

It will be seen that in each cradle unit C the upper or hinged support 10 is provided with a counterweight 22 which upon release and retraction of the swinging locking member 23 causes the hinged support 10 to automatically open to the dotted line position of Fig. 2, said counterweight preferably being massive enough to so function without manual aid, thus exposing the mold. As has been previously stated, the support 10 carries with it the uppermost section of the tire and the remaining section of the tire cradles or supports the mold. The mold may now readily be removed from the machine and a new one inserted after which the hinged support 10 is closed and the locking member 23 swung to its locking position, thus clamping the mold between the section of the tire. The machine is then ready for operation and when the pole has been properly formed within the mold the machine is stopped when the split in the tire is in a horizontal position whereupon release as above is made.

I claim:

1. A pole making machine comprising in combination, a mold, a sectional tire therefor, lower supporting means, and upper supporting means, one of said means being movable and adapted to carry a section of the tire therewith to expose parts lying therewithin, and the supporting means being arranged to co-operate to hold the sections of the tire in tire form when the parts are in operative position.

2. A pole making machine comprising in combination, a mold, a sectional tire therefor, lower supporting means, and upper supporting means, said upper supporting means being swingable and adapted to carry the section of the tire which is uppermost therewith as it is swung.

3. A pole making machine comprising in combination, a mold, a sectional tire therefor, lower supporting means, and upper supporting means, one of said means being counterweighted and movable to expose parts lying therewithin, and the supporting means being arranged to co-operate to hold the sections of the tire in tire form when the parts are in operative position, together with releasable means for locking the parts in such position.

4. A pole making machine comprising in combination, a mold, two semi-circular cradle-like mold embracing and supporting members, supporting and guiding rollers for said members and means for swinging a mold supporting member to a position to permit removal of the mold.

5. A pole making machine comprising in combination, a mold, a sectional tire therefor, spaced supporting rolls, spaced guiding rolls, and a support for said rolls, the portion carrying the guiding rolls being pivotable and adapted to hold the tire in tire form in one position and to carry a section of the tire therewith in another position to expose the mold.

6. A pole making machine comprising in combination, a mold, a sectional tire therefor, spaced supporting rolls, spaced guiding rolls, and a support for said rolls, the portion carrying the guiding rolls being pivotable and adapted to hold the tire in tire form in one position and to carry a section of the tire therewith in another position to expose the mold together with driving means associated with the aforesaid tire for rotating the mold thru the medium of said tire.

7. A pole making machine comprising in combination, a base; a mold; and a plurality of combined supporting and driving units for the mold including a frame structure having a swinging portion, and a split member revoluble in said frame structure, one portion of said member being adapted to be carried with the aforesaid swinging portion when it is swung and the remaining portion being adapted to be cradled in the remaining portion of said frame structure.

8. A pole making machine comprising in combination, a base, a mold, and a supporting and driving unit for the mold mounted on said base including a frame structure having a pivoted portion, guiding rollers in said pivoted portion, supporting rollers in the remaining portion, a split ring-like member intermediate the mold and said frame structure engageable by said rollers and means whereby a portion of the ring-like member is carried with the pivoted portion of the frame as it pivots, and driving means associated with said ring-like member.

9. A pole making machine comprising in combination, a mold and a supporting, guiding and driving unit for the mold including a pair of semi-circular members adapted to be releasably clamped to said mold, a part of said unit adapted to be swung away from the apparatus to expose the mold and adapted to carry a semi-circular member therewith.

10. A centrifugal pole making machine comprising in combination, a base, a mold, a plurality of cradles for revolubly supporting the mold on the base, one or more of which cradles are adjustable longitudinally of the base.

11. In a centrifugal pole making machine the combination of mold parts and a hinged support swingable to one side of the apparatus and adapted to carry a mold part when thus swung, together with means for moving said supports longitudinally of the mold.

12. In a centrifugal pole making machine, a mold, and a combined tire and driving member therefor comprising a base portion adapted to engage the mold, gear teeth carrying portions on opposite sides of the base portion and a tire portion, said portions being secured together.

13. A pole making maching comprising in combination, a mold, a split mold supporting collar, supporting and retaining rollers the latter of which are removable to free the mold, and means for carrying a portion of the split collar with said retaining collars.

In testimony whereof, I have hereunto signed my name.

DAVID B. HANNA.